(12) United States Patent
Vitry et al.

(10) Patent No.: US 7,798,540 B1
(45) Date of Patent: Sep. 21, 2010

(54) LOAD-FLOOR LATCH

(75) Inventors: Fabrice Vitry, Worcester (GB); Colin Latham, Bilton Rugby (GB)

(73) Assignee: Southco, Inc., Concordville, PA (US)

( * ) Notice: Subject to any disclaimer, the term of this patent is extended or adjusted under 35 U.S.C. 154(b) by 462 days.

(21) Appl. No.: 11/618,264

(22) Filed: Dec. 29, 2006
(Under 37 CFR 1.47)

Related U.S. Application Data

(63) Continuation of application No. PCT/US2005/023723, filed on Jun. 30, 2005.

(60) Provisional application No. 60/584,739, filed on Jun. 30, 2004.

(51) Int. Cl.
*E05C 3/16* (2006.01)
*E05B 3/00* (2006.01)

(52) U.S. Cl. .................. 292/216; 292/226; 292/336.3; 292/DIG. 31

(58) Field of Classification Search ............... 292/216, 292/219, 226, 336.3, DIG. 31
See application file for complete search history.

(56) References Cited

U.S. PATENT DOCUMENTS

| | | | |
|---|---|---|---|
| 1,073,057 A | 9/1913 | Schmid | |
| 1,090,305 A | 3/1914 | Hoffman | |
| 2,117,339 A | 5/1938 | Claud-Mantle | |
| 2,186,903 A | 1/1940 | Gleason | |
| 2,600,483 A | 6/1952 | Colonna | |
| 2,649,322 A | 8/1953 | Mack | |
| 2,763,503 A | 9/1956 | Tasch et al. | |
| 2,987,908 A | 6/1961 | Pelcin | |
| 3,494,650 A | 2/1970 | Slopa | |
| 3,495,862 A | 2/1970 | McClintock | |
| 3,743,336 A | 7/1973 | Andrews | |
| 3,758,140 A | 9/1973 | Prete, Jr. | |
| 3,782,141 A | 1/1974 | Doerrfeld | |
| 4,138,869 A | 2/1979 | Pelcin | |
| 4,186,952 A | 2/1980 | Glass | |
| 4,192,536 A | 3/1980 | Laureano | |
| 4,322,958 A | 4/1982 | Eigmemeier | |
| 4,438,964 A | 3/1984 | Peters | |
| 4,492,396 A | 1/1985 | Luke et al. | |
| 4,542,924 A | 9/1985 | Brown et al. | |
| 4,552,001 A | 11/1985 | Roop | |
| 4,638,649 A | 1/1987 | Chao | |
| 4,650,230 A | 3/1987 | Takasaki | |
| 4,704,882 A | 11/1987 | Takasaki | |
| 4,911,487 A | 3/1990 | Rachocki | |
| 4,969,916 A | 11/1990 | Weinerman et al. | |
| 4,973,091 A | 11/1990 | Paulson et al. | |

(Continued)

FOREIGN PATENT DOCUMENTS

DE    20316663    1/2004

(Continued)

*Primary Examiner*—Carlos Lugo
(74) *Attorney, Agent, or Firm*—Paul & Paul

(57) ABSTRACT

A latch having a housing, handle, actuators, pawl and rotary pawl torsion spring and two actuator torsion springs. The rotary pawl torsion spring biases the pawl toward the unlatched or opened position. The handle is pivotally attached to the housing and has two paddles that engage the actuator. The actuator is slidably supported by the housing. Lifting the handle to the open position causes rotating movement of the actuator which in turn causes the pawl to rotate to the unlatched or retracted position.

9 Claims, 4 Drawing Sheets

U.S. PATENT DOCUMENTS

| | | |
|---|---|---|
| 4,979,384 A | 12/1990 | Malesko et al. |
| 4,989,907 A | 2/1991 | Edmonds et al. |
| 5,042,853 A * | 8/1991 | Gleason et al. ............. 292/126 |
| 5,046,340 A | 9/1991 | Weinerman et al. |
| 5,098,141 A | 3/1992 | Bull |
| 5,127,686 A | 7/1992 | Gleason et al. |
| 5,234,238 A | 8/1993 | Takimoto |
| 5,292,159 A | 3/1994 | Sandhu et al. |
| 5,297,404 A | 3/1994 | Embry |
| 5,299,844 A | 4/1994 | Gleason |
| 5,301,989 A | 4/1994 | Dallmann et al. |
| 5,321,962 A | 6/1994 | Ferchau et al. |
| 5,340,174 A | 8/1994 | Bender et al. |
| 5,413,391 A | 5/1995 | Clavin et al. |
| 5,484,178 A | 1/1996 | Sandhu et al. |
| 5,820,174 A | 10/1998 | Parikh et al. |
| 5,878,608 A | 3/1999 | Alyanakian |
| 5,927,772 A | 7/1999 | Antonucci et al. |
| 5,927,773 A | 7/1999 | Larsen et al. |
| 6,048,001 A | 4/2000 | Miller et al. |
| 6,048,006 A | 4/2000 | Antonucci et al. |
| 6,109,669 A | 8/2000 | Pinkow |
| 6,256,194 B1 | 7/2001 | Choi et al. |
| 6,290,270 B1 | 9/2001 | Spiessl |
| 6,409,234 B1 | 6/2002 | Larsen |
| 6,460,902 B1 | 10/2002 | Kyle |
| 6,626,472 B1 | 9/2003 | Berg |
| 6,719,332 B2 * | 4/2004 | Sekulovic ................. 292/170 |
| D506,120 S * | 6/2005 | Straka et al. ................. D8/331 |
| 7,052,053 B2 * | 5/2006 | Hall et al. ................... 292/126 |
| 7,065,992 B2 * | 6/2006 | Talukdar et al. ............... 70/208 |
| 7,204,528 B2 * | 4/2007 | Vitry et al. ................... 292/165 |
| 7,313,937 B2 * | 1/2008 | Straka, Jr. .................... 70/137 |
| 2002/0163205 A1 | 11/2002 | Sekulovic |
| 2003/0025339 A1 | 2/2003 | Vitry et al. |
| 2003/0193199 A1 | 10/2003 | Talukdar et al. |
| 2004/0113432 A1 | 6/2004 | Hall |
| 2007/0216173 A1 * | 9/2007 | Vitry ....................... 292/336.3 |

FOREIGN PATENT DOCUMENTS

| | | |
|---|---|---|
| GB | 573165 | 11/1945 |
| GB | 2257745 | 1/1993 |

\* cited by examiner

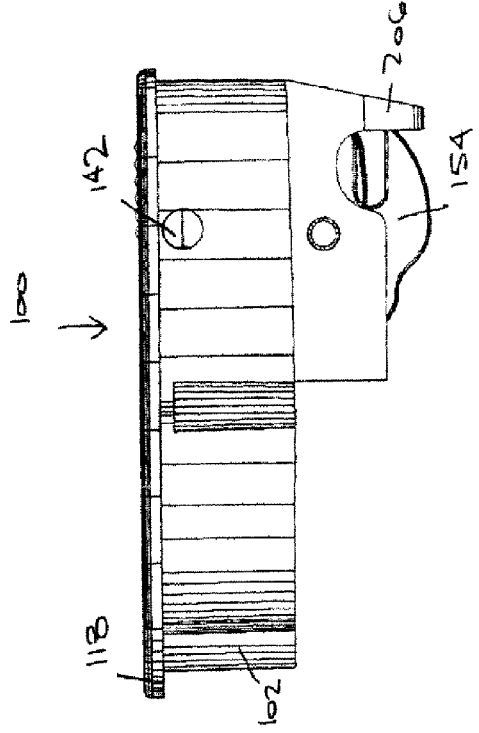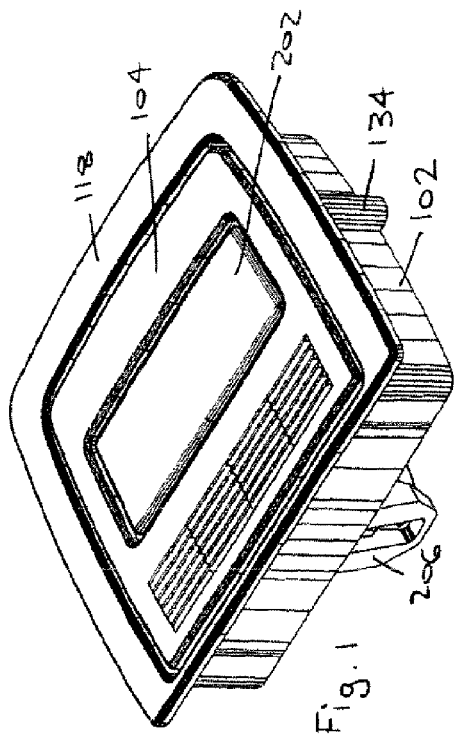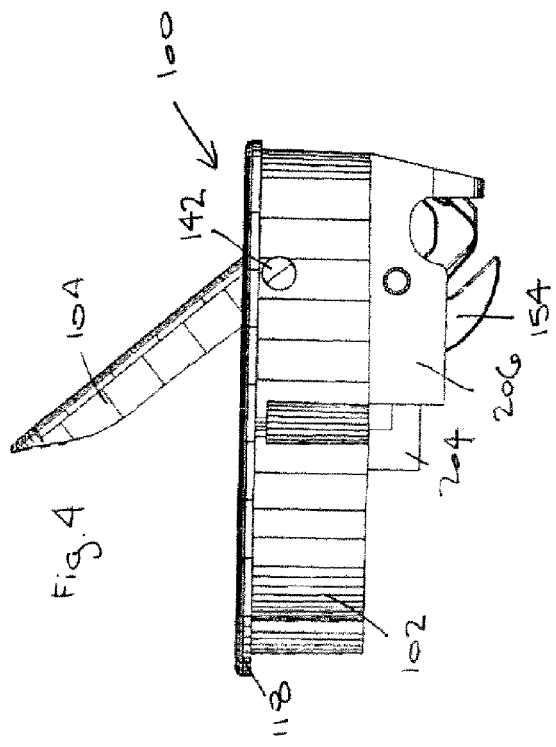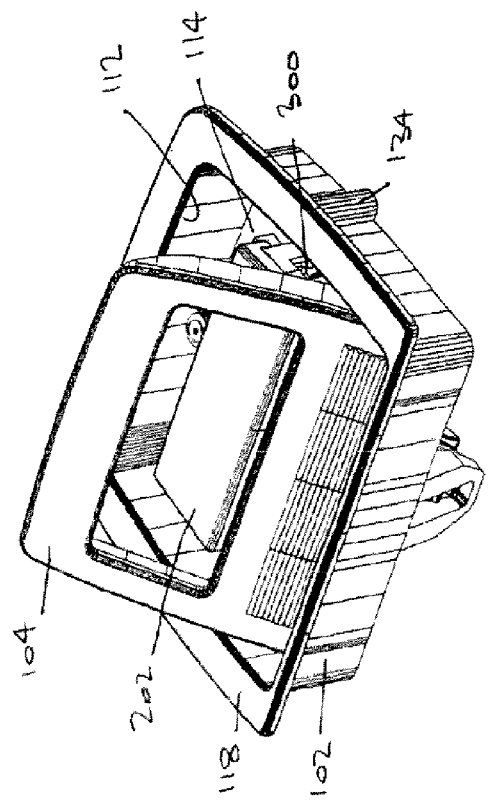

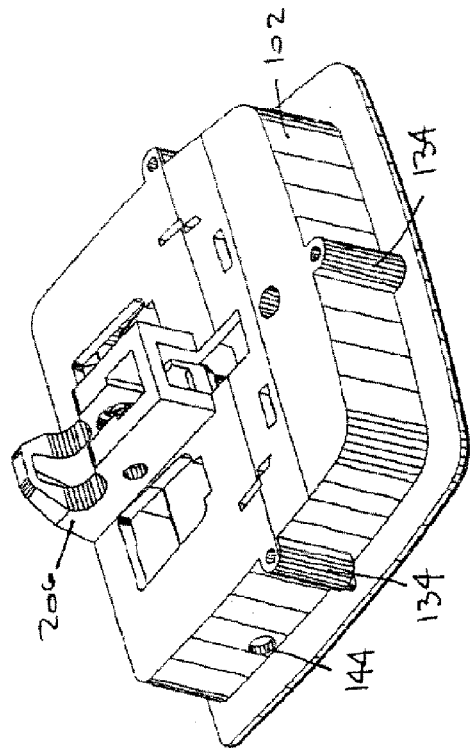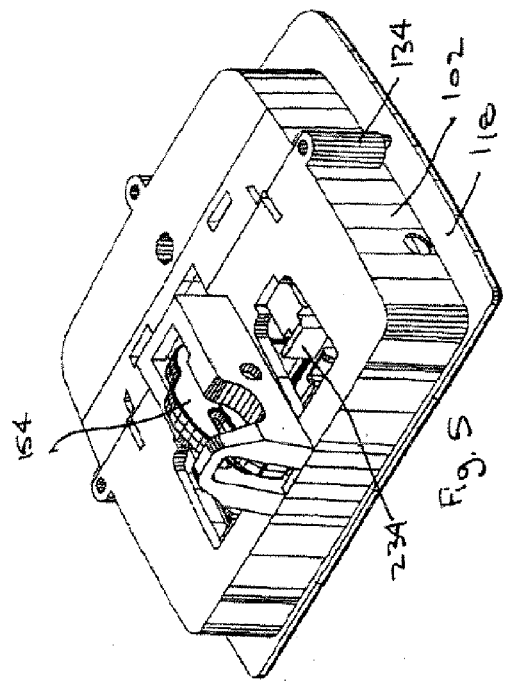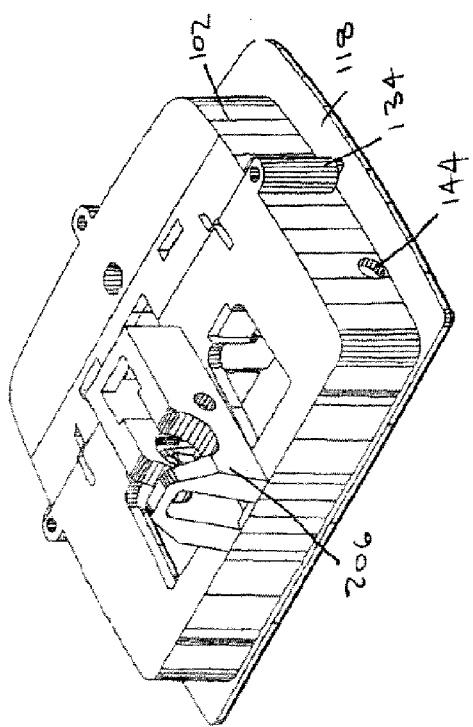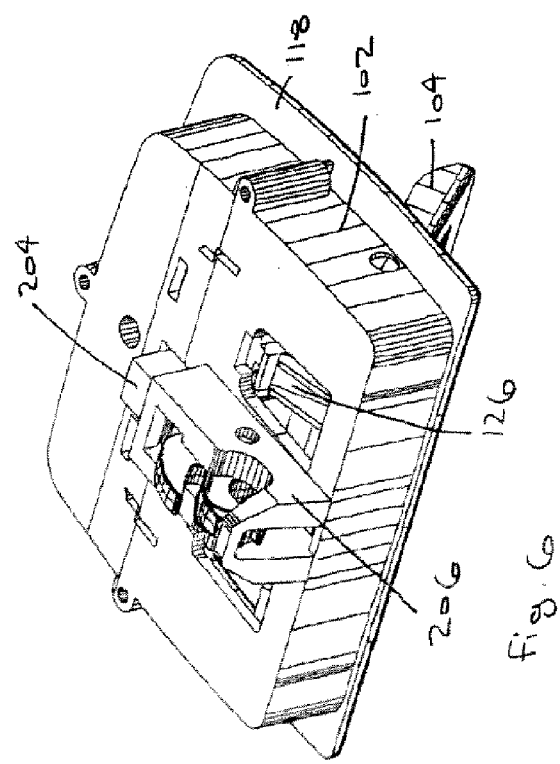

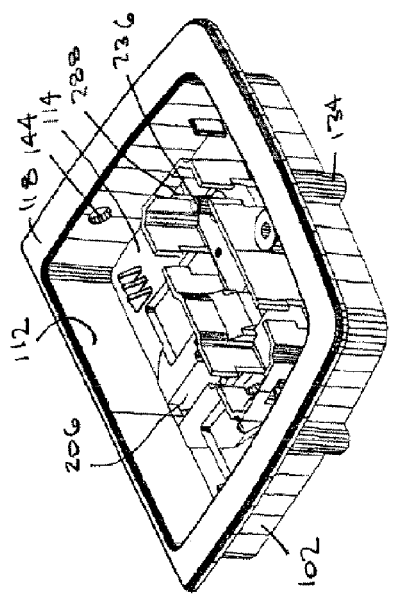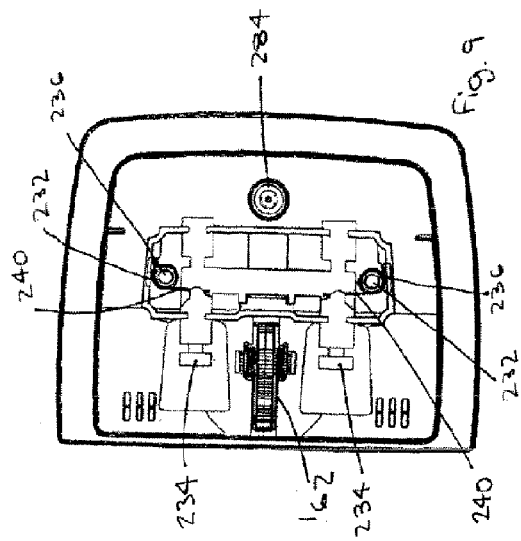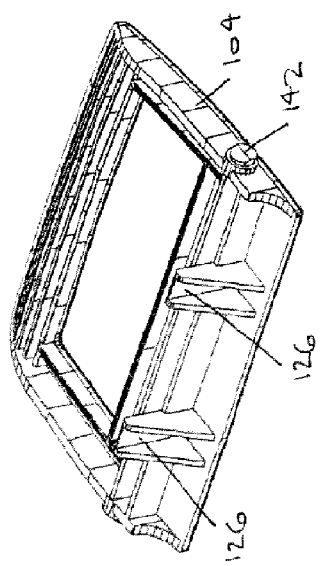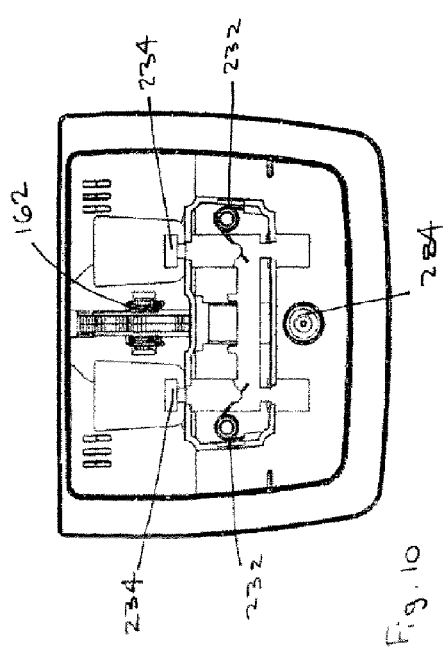

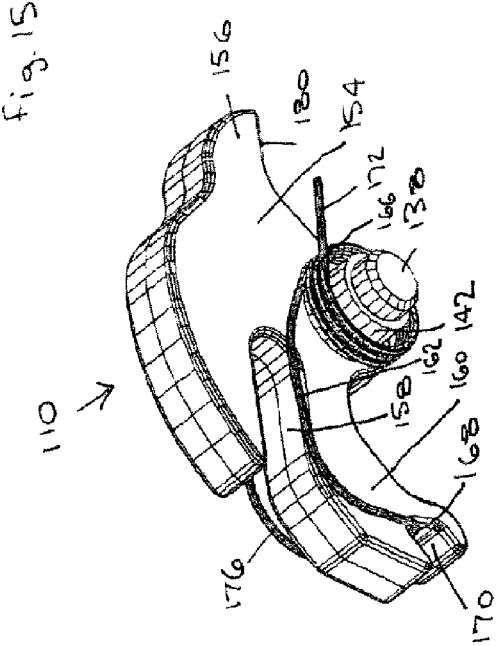
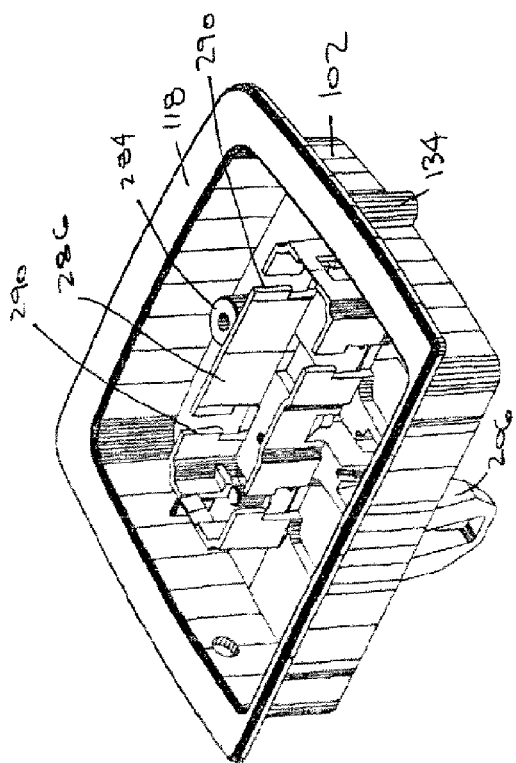
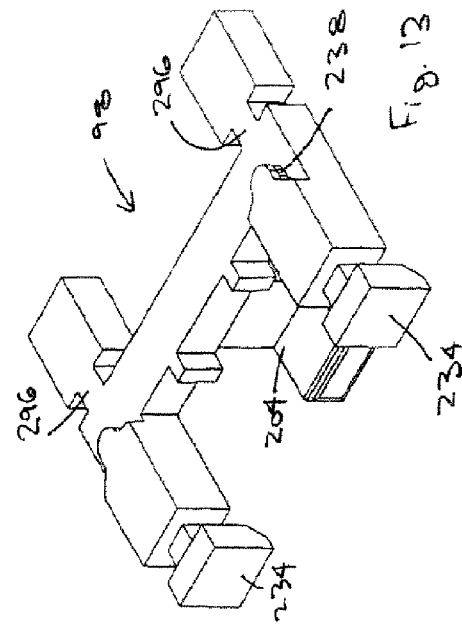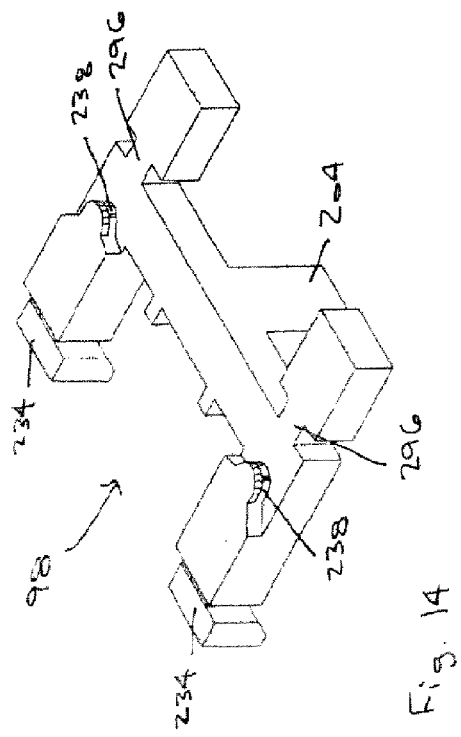

LOAD-FLOOR LATCH

RELATED APPLICATIONS

This application is a continuation of International Application No. PCT/US2005/023723, filed Jun. 30, 2005, which claims the benefit of U.S. Provisional Application No. 60/584,739, filed Jun. 30, 2004.

BACKGROUND THE INVENTION

1. Field of the Invention

The present invention relates to a latching device for releasably securing a closure member, such as a panel or door, in the closed position.

2. Description of the Prior Art

Trunks of automobiles are usually provided with removable load floor panels. These panels ordinarily support the weight of objects placed in the trunks of cars and are removable to allow access to a spare tire, for example, which is commonly stored under the load floor panel. It is common for the load floor panel to be held in place by gravity and a floor mat that usually covers the load floor panel. The load floor panels are usually equipped with handles that are flush with the top surface of the load floor panel in order to allow a user to remove the panel when necessary. However, this commonly used arrangement has a draw back in that the load floor panel may become dislodged when travelling over rough roads. Further, because the panel is not positively secured in place, it may become loose and rattle around in the trunk resulting in undesirable noises. The need persists in the art for a latch to positively secure such load floor panels in place.

SUMMARY OF THE INVENTION

The present invention is directed to a latch for use with closure members such as panels, drawers, doors, etc. Although the operation of the latch will be described in the context of securing the load floor panel of the trunk of an automobile, the latch of the present invention is widely applicable to many kinds of doors, windows, panels, and drawers The latch of the present invention releasably secures a first closure member, such as a door, window, panel, or drawer, to a second closure member, such as another door, window, panel, or drawer or a fame surrounding the first closure member. The latch of the present invention includes a housing, a handle having two protuberances, a pawl, a pawl torsion spring, an actuator with two paddles and two torsion springs connected to the housing. The latch housing has a depression which receives the handle when the handle is in the closed position. The depression has an essentially enclosed bottom and an open top surrounded by a bezel or flange. The latch housing further has a pawl receptacle attached to he bottom of the depression. The receptacle houses the pawl torsion spring and the pawl, which is rotatable. The handle can be in the form of a paddle or a ring to facilitate grasping of the handle by a user using three or four fingers.

The latch body is installed in an aperture in die closure member using any of several well-known fasteners. The receptacle houses the pawl and pawl torsion spring and biases the pawl such that the pawl is urged to rotate to the unlatched or open position. The handle is pivotally supported by the housing and has actuating protuberances that impinge upon paddles of the actuator. When the latch handle is lifted out of the depression of the housing, the protuberances on the handle act against paddles on the actuator to retract the actuator to the unlatched position against the spring action of the actuator torsion springs which urge the handle to the closed position. An arm on the actuator is displaced toward e rear of the housing when the handle is moved to the open position against the spring action of the actuator torsion springs, and the spring action of the pawl torsion spring urges the pawl to the open position against the rearwardly displaced actuator am thus opening the latch and releasing a keeper on a second closure member.

When the latch is in the open position and the closure member in which the latch is mounted is slammed closed, the shape of the outwardly exposed surfaces of the pawl permit the action of the keeper to provide slam-close action to the rotary pawl.

In order to close the latch in a manner other than ugh slam-close action of the latch a user can lift the handle and permit the keeper to contact the pawl and thereby rotate the pawl into the closed position.

Accordingly, it is a principal object of the invention to provide a latch assembly which automatically engages a keeper on a second closure member as a first closure member is slammed shut.

It is a further object of the invention to provide a latch having a low profile such that it does not project significantly above the surface of a panel to which the latch is mounted.

Still another object of the invention is to provide a latch assembly having a pivoting handle which rotates the pawl to the unlatched position.

Yet another object of the invention is to provide a latch assembly having a handle which can be used to move the panel to which the latch is attached.

These and other objects of the present invention will become readily apparent upon further review of the following specification and drawings.

BRIEF DESCRIPTION OF THE DRAWINGS

FIG. 1 is a perspective view of the latch assembly of the present invention, showing the latch assembly in the closed or latched configuration.

FIG. 2 is a perspective view of the latch assembly of the present invention, showing the latch in the open and unlatched configuration.

FIG. 3 is a side view of the latch assembly of the present invention in the closed or latched configuration.

FIG. 4 is a side view of the latch assembly of the present invention in the open or unlatched configuration.

FIG. 5 is a perspective view of the underside of the latch assembly of the present invention, showing the latch assembly in the closed or latched configuration.

FIG. 6 is a perspective view of the underside of the latch assembly of the present invention, showing the latch in the open and unlatched configuration.

FIGS. 7 and 8 are perspective views of the bottom of the housing of the latch assembly of the present invention showing the pawl receptacle.

FIG. 9 is a top plan view of the of the latch assembly of the present invention, showing the latch assembly in the closed or latched configuration with the latch handle removed.

FIG. 10 is a top plan view of the latch assembly of the present invention, showing the latch in the open and unlatched configuration with the latch handle removed.

FIG. 11 is a perspective view of the top of the housing of the latch assembly of the present invention showing the pawl receptacle.

FIG. 12 is a perspective view of the bottom of the handle of the latch of the present invention.

FIGS. 13 and 14 are perspective views of the top of the actuator of the latch of the present invention.

FIG. 15 is a perspective view of the pawl and pawl torsion spring of the latch of the present invention.

FIG. 16 is a perspective view of the housing of the latch of the present invention.

Similar reference characters denote corresponding features consistently throughout the attached drawings.

DETAILED DESCRIPTION OF THE PREFERRED EMBODIMENTS

Referring to FIGS. 1-16, the present invention is directed to a latch assembly 100 for use with closure members such as panels, drawers, doors, etc. Although the operation of the latch 100 will be described in the context of securing the load floor panel of the trunk of an automobile, the latch of the present invention is widely applicable to many kinds of doors, windows, panels, and drawers. The latch 100 of the present invention releasably secures a first closure member, such as a door, window, panel, or drawer, to a keeper on a second closure member, such as another door, window, panel, or drawer or a frame surrounding the first closure member. The latch assembly 100 of the present invention includes a housing 102, a handle 104, a pawl torsion spring 162, actuator 98, actuator torsion springs 232, and a pawl 110.

The latch housing 102 has a cavity or depression 112 which receives the handle 104 when the handle is in the closed position shown in FIG. 1. The depression 112 has an essentially enclosed bottom 114 and is surrounded by a bezel or flange 118. The latch housing further has a receptacle 206 attached to the underside of the enclosed bottom 114 of the depression 112. The receptacle 206 houses the pawl 110 and pawl torsion spring 162. Cylindrical sleeves 134 project downward from the flange 118. Referring to FIGS. 1 and 2, the housing 102 is installed to a loadfloor panel by providing an opening in the loadfloor panel. The perimeter of the opening in the loadfloor panel should be smaller than the perimeter of the flange 118. The housing 102 is installed in the opening with the underside of the flange 118 abutting the outer surface of the panel. The panel should have cutouts for the sleeves 134, or be otherwise dimensioned and/or configured to allow access to the sleeves 134 from the underside of the panel. The housing 102 can then be secured to the panel using, for example, self-tapping screws which engage die sleeves from the underside of the panel.

The handle 104 can be in the form of a ring, as shown in FIG. 12 to facilitate grasping of the handle 104 by a user using three or four fingers. The handle 104 also has a pair of cylindrical projections 142 that project from either side of the handle 104. The projections 142 snap into openings 144 to pivotally attach the handle 104 to the housing 102. When the handle 104 is in the closed position, the handle 104 is received in the cavity 112 such that the top of the handle 104 is flush with the flange 118. This feature gives the latch 100 a very low profile, because the flange 118 projects only slightly from the outer surface of the panel. The handle 104 must be lifted in order to move the handle 104 to the open position. The handle 104 is preferably sized to allow insertion of three or four fingers of the user's hand, which allows the handle 104 to be grasped and lifted by a user.

As previously stated, the housing 102 is installed in an aperture in the first closure member or panel using any of several well-known fasteners. The receptacle 206 houses the pawl 110 and pawl spring 162 such that the pawl 110 rotates in the receptacle 206 to the open or unlatched position due to the biasing force of the pawl torsion spring biasing the pawl 110. The extended or latched position of the pawl 110 is shown in FIGS. 1, 3, 5, and 9, while the retracted or unlatched position of the latch 100 is show in FIGS. 2, 4, 6 and 10.

The handle 104 is pivotally supported by the housing 102 and has actuating protuberances 126 that impinge upon paddles 234 of the actuator 98 when the handle 104 is lifted. When the latch handle 104 is lifted out of the depression 112 of the housing 102, the protuberances 116 seen in FIG. 12 on the handle 104 retract the actuator 98 to the unlatched position against the spring action of the actuator torsion springs 232 on actuator torsion spring prongs 236 which urge the handle 104 to the closed position. An arm 204 on the actuator 98 is displaced toward the rear of the housing 102 as seen in FIG. 6 when the handle 104 is moved to the open position against the spring action of the actuator torsion springs 236. The spring action of the pawl torsion spring 162 urges the pawl 110 to the open position such that lug 156 of pawl 110 is released from engagement with actuator arm 204 which has been displaced toward the rear of the housing 102 thus opening the latch 100 and permitting the pawl 110 to release a keeper (not shown) on a second closure member.

Lifting the handle 104, causes the protuberances 126 of handle 104 to push the actuator 98 and in turn actuator arm 204 toward the rear of the housing 102 which in turn permits the pawl torsion spring 162 to urge pawl 110, toward the open or unlatched position until the pawl 110 reaches its fully retracted, open or unlatched position as shown. The panel can then be opened, i.e. lifted away from the second closure member.

During closing of the first closure member, contact of a keeper with the pawl 110 in receptacle 206 acts to rotate the pawl 110 to the latched position as the first closure member is slammed shut. Thus, the first closure member is releasably secured in place.

As seen in FIG. 15, the pawl 110 is has a body portion 154 with the pair of pawl pivot members 138 extending therefrom. The pawl 110 has a lug or projection 156 and is provided with a pawl slot 158 to retain the keeper member (not shown) when the pawl 110 is in the latched position. The keeper member will be positioned or caught in the closed or latched position in pawl slot 158. The pawl 110 is also provided with an arm portion 160 extending from the pawl boy 154.

A pawl torsion spring 162 is installed on the pawl 110 with the coiled portions 166 and 166 surrounding the base portions 142 of the pawl pivot members 138. The cross bar 168 of the torsion spring 162 engages the notch 70 in the arm portion 160. In the illustrated example the notch 170 is enlarged to more positively retain the cross bar 168 in position relative to the pawl 110. The torsion spring 162 also has tail portions 172 and arms 176. The vertical spring arms 176 extend from the respective coiled portions 166 of the torsion spring 162 and connect to cross bar 168. The pawl arm 160 is positioned intermediate the spring arms 176. When the pawl 110 is installed in the housing 102, the notch 170 is located further to the rear relative to the pawl slot 158. The projection or lug 156 has a flat surface 180 that extends roughly in a radial direction relative to the pivot axis of the pawl 110.

As seen in FIGS. 13 and 14, actuator 98 has actuator arm 204 extending downwardly below the housing 102 when the actuator 98 is mounted thereon. Actuator spring indents 238 on the actuator 98 provide for engagement of one of two actuator torsion spring legs 240. The actuator 98 can be mounted in the housing 102 by feeding the actuator yokes 296 through actuator cutouts 290.

The latch of the present invention is fitted with cover piece 202 as shown in FIG. 2, which has cover piece prongs 300 which snap fit into cover piece aperture 288 on cover piece support 286.

The latch 100 of the present invention also optionally has a bump stop 284 seen in FIG. 10 which can dampen the motion of the handle 104 as the handle 102 returns to the at rest and closed position.

It is to be understood that the present invention is not limited to the embodiments described above, but encompasses any and all embodiments within the scope of the following claims.

We claim:

1. A latch for releasably securing a first closure member to a second closure member in a latched position, the latch comprising:
    a housing adapted for being received in an aperture formed in the first closure member, the housing is composed of a main housing having a bottom surface and a receptacle attached to the bottom surface;
    a handle pivotally attached to the main housing, the handle being pivotable along a pivot-axis between an open and a closed position, the handle having at least one protuberance;
    a pawl mounted on the receptacle, the pawl being rotatable about a rotation-axis between a latched and an unlatched position, the rotation-axis being parallel to said pivot-axis;
    a pawl biasing means for biasing the pawl toward the unlatched position; and
    an actuator mounted inside the main housing to the bottom surface, the actuator having at least one paddle for engagement with the at least one protuberance of the handle to slide the actuator from a rest position to a retracted position when the handle is pivoted from the closed position and an arm extending through said bottom surface and into the receptacle for engagement and disengagement with the pawl, the at least one paddle and the arm being integral with said actuator;
    the receptacle having a bottom opening to allow the pawl to interact with the second closure element and a rear opening to allow the arm to move inside and outside the receptacle to interact with the pawl;
    whereby pivotal movement of the handle when the pawl is in the latched position provides for engagement of the at least one protuberance of the handle with the at least one paddle of the actuator such that the actuator is displaced toward the retracted position, such that the arm is displaced away from said pawl and outside the receptacle to disengage with the pawl thus permitting the biasing force of the pawl biasing device to rotate the pawl to the unlatched position.

2. The latch of claim 1 further comprising at least one actuator biasing means for biasing against the pivoting of the handle from the closed position.

3. The latch of claim 2 wherein the pawl biasing means is a torsion spring.

4. The latch of claim 3 wherein the at least one actuator biasing means is a torsion spring.

5. The latch of claim 2 wherein the handle is ring-shaped.

6. The latch of claim 2, wherein the housing is provided with a flange for contacting the closure member when the latch is provided in the first closure member.

7. The latch of claim 2 wherein the handle has two protuberances and the actuator has two paddles for engagement with a respective protuberance on the handle.

8. The latch of claim 7 wherein the handle is located in a depression of the housing such that the handle is flush with the housing when the handle is in the closed position.

9. The latch of claim 8 wherein the pawl receptacle houses the pawl biasing means.

* * * * *